US012561175B2

(12) United States Patent
Jha et al.

(10) Patent No.: US 12,561,175 B2
(45) Date of Patent: Feb. 24, 2026

(54) SYSTEMS AND METHODS FOR INCREASING REQUEST PROCESSING PERFORMANCE

(71) Applicant: Truist Bank, Charlotte, NC (US)

(72) Inventors: Sanjeev Kumar Jha, Marietta, GA (US); Tekchand Prasad, Alpharetta, GA (US); Suresh Edupuganti, Marietta, GA (US)

(73) Assignee: Truist Bank, Charlotte, NC (US)

( * ) Notice: Subject to any disclaimer, the term of this patent is extended or adjusted under 35 U.S.C. 154(b) by 433 days.

(21) Appl. No.: 18/117,670

(22) Filed: Mar. 6, 2023

(65) Prior Publication Data

US 2024/0303126 A1 Sep. 12, 2024

(51) Int. Cl.
*G06F 9/46* (2006.01)
*G06F 9/50* (2006.01)

(52) U.S. Cl.
CPC ............ *G06F 9/505* (2013.01); *G06F 9/5044* (2013.01)

(58) Field of Classification Search
CPC .............................. G06F 9/505; G06F 9/5044
See application file for complete search history.

*Primary Examiner* — Gregory A Kessler

(74) *Attorney, Agent, or Firm* — Kilpatrick Townsend & Stockton LLP; Michael A. Springs, Esq.

(57) ABSTRACT

Request processing performance of a processing network can be increased using certain systems and methods. For example, a request processing platform can receive a plurality of operation requests generated by a load simulator. The load simulator may test a target load associated with the plurality of operation requests. Based on the target load, the request processing platform can adjust an allocation of computing resources in the request processing platform. Additionally, the request processing platform can adjust a configuration of an orchestration engine based on a predetermined throughput threshold associated with the target load. The request processing platform may establish a connection to an internal service platform that can process the plurality of operation requests. In response to establishing the connection, the request processing platform can transmit the plurality of operation requests to the internal service platform to process a predetermined number of operation requests associated with the target load.

20 Claims, 4 Drawing Sheets

300

302
Receive a plurality of operation requests generated by a load simulator, the load simulator being configured to test a target load associated with the plurality of operation requests

304
Adjust an allocation of computing resources in the request processing platform based on the target load

306
Adjust a configuration for an orchestration engine in the request processing platform based on a predetermined throughput threshold associated with the target load

308
Establish a connection to an internal service platform, the internal service platform being configured to process the plurality of operation requests

310
Transmit the plurality of operation requests to the internal service platform for processing a predetermined number of operation requests associated with the target load

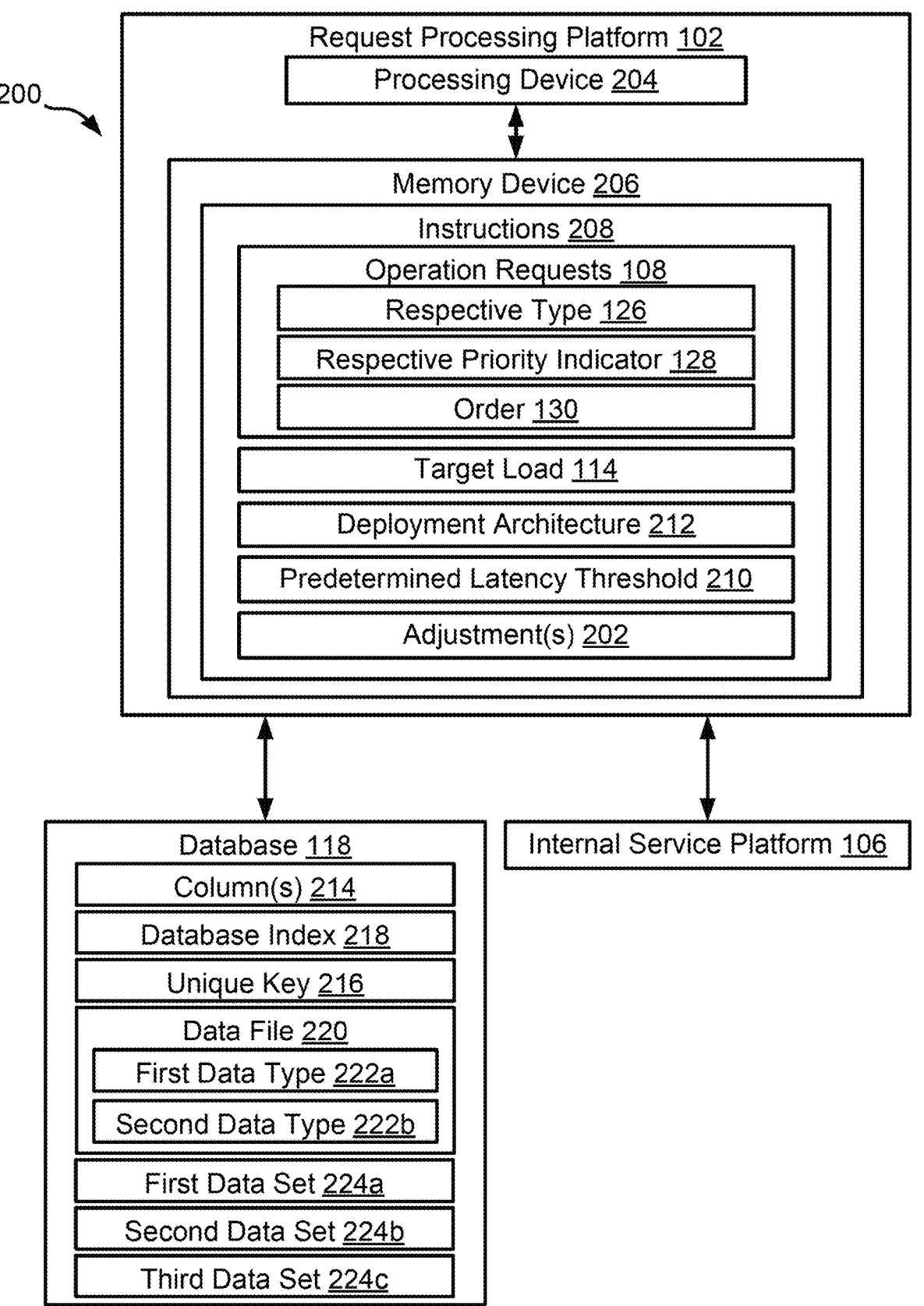

200

Request Processing Platform 102

Processing Device 204

Memory Device 206

Instructions 208

Operation Requests 108

Respective Type 126

Respective Priority Indicator 128

Order 130

Target Load 114

Deployment Architecture 212

Predetermined Latency Threshold 210

Adjustment(s) 202

Database 118

Column(s) 214

Database Index 218

Unique Key 216

Data File 220

First Data Type 222a

Second Data Type 222b

First Data Set 224a

Second Data Set 224b

Third Data Set 224c

Internal Service Platform 106

*FIG. 2*

300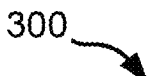

---

302
Receive a plurality of operation requests generated by a load simulator, the load simulator being configured to test a target load associated with the plurality of operation requests

↓

304
Adjust an allocation of computing resources in the request processing platform based on the target load

↓

306
Adjust a configuration for an orchestration engine in the request processing platform based on a predetermined throughput threshold associated with the target load

↓

308
Establish a connection to an internal service platform, the internal service platform being configured to process the plurality of operation requests

↓

310
Transmit the plurality of operation requests to the internal service platform for processing a predetermined number of operation requests associated with the target load

*FIG. 3*

SYSTEMS AND METHODS FOR INCREASING REQUEST PROCESSING PERFORMANCE

TECHNICAL FIELD

The present disclosure relates generally to request processing and, more particularly (although not necessarily exclusively), to increasing request processing performance in a processing network.

BACKGROUND

In some examples, a processing network for processing operation requests may encounter performance bottlenecks that hinder request processing performance for the processing network. In one example, the processing network may be provided limited channels for processing the operation requests. For example, only a single communication channel may be available to transfer the operation requests to the processing network, thereby limiting bandwidth available to the processing network. Further, load testing of the processing network may not be readily available such that a developer may be required to perform several steps to validate assumptions regarding the performance bottlenecks. A process of validating the assumptions may be repeated each time an adjustment is made to the processing network and may be prohibitively expensive in terms of man-hours, computing resources, and user downtime.

SUMMARY

In one example, a non-transitory computer-readable medium includes instructions that are executable by a processing device of a request processing platform for performing operations. The operations include receiving a plurality of operation requests generated by a load simulator. The load simulator can test a target load associated with the plurality of operation requests. The operations further include adjusting an allocation of computing resources in the request processing platform based on the target load. Additionally, the operations include adjusting a configuration of an orchestration engine in the request processing platform based on a predetermined throughput threshold associated with the target load. Further, the operations include establishing a connection to an internal service platform. The internal service platform can process the plurality of operation requests. The operations additionally include, in response to establishing the connection to the internal service platform, transmitting the plurality of operation requests to the internal service platform to process a predetermined number of operation requests associated with the target load.

In another example, a computer-implemented method includes receiving, by a request processing platform, a plurality of operation requests generated by a load simulator. The load simulator can test a target load associated with the plurality of operation requests. The method also includes adjusting, by the request processing platform, an allocation of computing resources in the request processing platform based on the target load. Additionally, the method includes adjusting, by the request processing platform, a configuration of an orchestration engine in the request processing platform based on a predetermined throughput threshold associated with the target load. Further, the method includes establishing, by the request processing platform, a connection to an internal service platform that can process the plurality of operation requests. The method additionally includes, in response to establishing the connection to the internal service platform, transmitting, by the request processing platform, the plurality of operation requests to the internal service platform to process a predetermined number of operation requests associated with the target load.

In a further example, a system includes a processing device of a request processing platform and a memory device that includes instructions executable by the processing device for causing the processing device to perform operations. The operations include receiving a plurality of operation requests generated by a load simulator. The load simulator can test a target load associated with the plurality of operation requests. The operations further include adjusting an allocation of computing resources in the request processing platform based on the target load. Additionally, the operations include adjusting a configuration of an orchestration engine in the request processing platform based on a predetermined throughput threshold associated with the target load. Further, the operations include establishing a connection to an internal service platform. The internal service platform can process the plurality of operation requests.

BRIEF DESCRIPTION OF THE DRAWINGS

FIG. 2 is a block diagram of an example of a computing system capable of implementing adjustments to increase request processing performance, according to one example of the present disclosure.

FIG. 3 is a flowchart of a process for implementing adjustments to increase request processing performance in a processing network, according to one example of the present disclosure.

DETAILED DESCRIPTION

Certain aspects and examples of the present disclosure relate to a system and method for increasing request processing performance for a processing network. The processing network may include a system to facilitate interprocess communications (e.g., processing operation requests) between computing systems. In an example, one computing system may provide limited communication channels for another computing system to process the operation requests using the interprocess communications. Because of the limited communication channels available to fulfill the operation requests, adjustments to a request processing platform in the processing network may increase request processing performance to enable the processing network to fulfill a target load associated with the operation requests. For example, the adjustments can ensure that a relatively higher amount of operation requests are successfully processed in a predetermined amount of time.

In some examples, the adjustments to the request processing platform can be based on successfully processing a predetermined number of operation requests associated with the target load. For example, a load simulator of one computing device, which may be employed to emulate an actual computing device with limited communication channels when those communication channels are not available, may generate a plurality of operation requests to simulate the target load for the request processing platform. The load simulator can enable load testing of the processing network by generating a variable number of operation requests such that the target load can be adjusted or retested.

The predetermined number of operation requests can be a subset of the operation requests that are processed to meet performance requirements to enable relatively quick processing associated with the operation requests. Computing resources associated with the processing network can be allocated in the request processing platform based on the target load. Additionally or alternatively, the allocation of the computing resources can be based at least in part on throughput requirements (e.g., the predetermined throughput threshold) for the request processing platform. The predetermined throughput threshold can be determined using the target load such that the computing resources can be allocated to increase throughput of the operation requests in the request processing platform.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
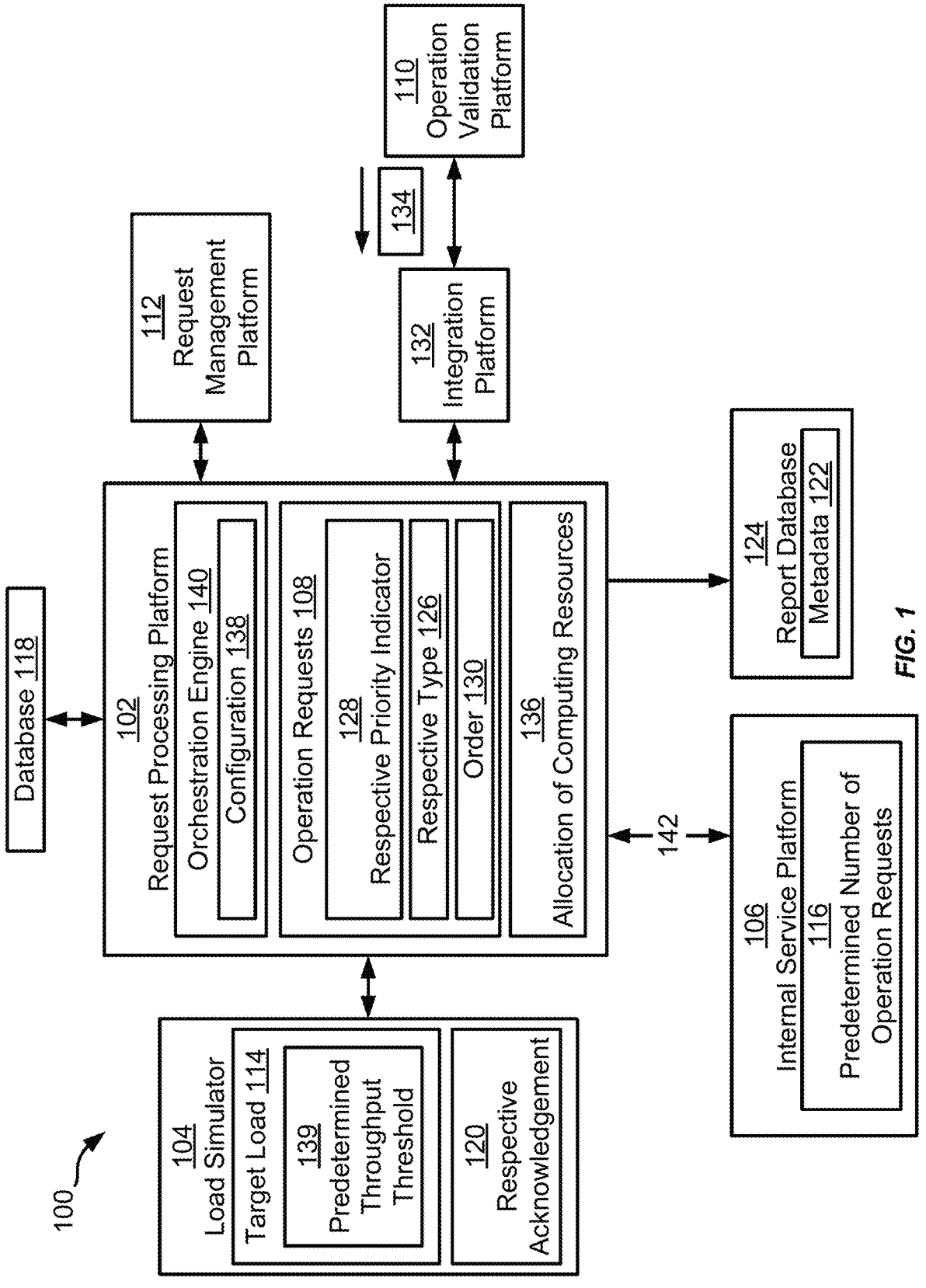
FIG. 1 is a block diagram of an example of a processing network with adjustments to increase request processing performance, according to one example of the present disclosure.

FIG. 1 is a block diagram of an example of a processing network 100 with adjustments to increase request processing performance, according to one example of the present disclosure. In an example, the processing network 100 can include a request processing platform 102, a load simulator 104, and an internal service platform 106 (e.g., a global payments platform (GPP)). In some examples, the load simulator 104 may be a simulator of an external-service provider, such as a transaction clearinghouse (TCH). The internal service platform 106, in some examples, may process a plurality of operation requests 108, such as real-time payments (RTPs) from a bank, for example. RTPs include electronic payments between parties that are initiated and settled in near real time at any time of day and on any day of the week. Because RTPs are performed in substantially real time, the internal service platform 106 may rely upon validation features in the processing network 100. For example, the request processing platform 102 may be communicatively coupled with an operation validation platform 110 that the internal service platform 106 relies upon to facilitate real-time operation requests. In some examples, the processing network 100 additionally can include a request management platform 112 (e.g., Digital Treasury) communicatively coupled with the request processing platform 102. The request management platform 112 can facilitate real-time reporting of the operation requests 108, initiation of the operation requests 108, and validation management associated with processing the operation requests 108. For example, the request management platform 112 can be a cash management environment for commercial and corporate customers of a bank.

If the external-service provider provides limited communication channels to other computing systems, the request processing performance may in turn be limited, thereby causing poor performance for the request processing platform 102. For example, a number of operation requests processed by the internal service platform 106 being below a minimum threshold can cause slow network performance in the processing network 100. Accordingly, the adjustments can be made to the request processing platform 102 to increase the request processing performance. In an example, the load simulator 104 may determine a target load 114 as a threshold to meet for increasing the request processing performance. For example, the target load 114 can be determined based on a predetermined number of operation requests 116 to be processed by the internal service platform 106. Additionally or alternatively, the load simulator 104 may receive the target load 114 to use for generating the operation requests 108 to test the request processing platform 102. Using the target load 114, the load simulator 104 can generate the operation requests 108 such that the operation requests 108 are received by the request processing platform 102 for processing. In some examples, the processing network 100 can include a database 118 communicatively coupled with the request processing platform 102 to store information associated with processing the operation requests 108.

In response to receiving the operation requests 108 from the load simulator 104, the request processing platform 102 can transmit a respective acknowledgement 120 associated with the operation requests 108 to the load simulator 104. Waiting to transmit the respective acknowledgement 120 after storing metadata 122 associated with the operation requests 108 can be relatively time-consuming. Instead, the request processing platform 102 can first transmit the respective acknowledgement 120 prior to storing the metadata 122. For example, the request processing platform 102 can transmit a pacs. 002 message or a status report message to the load simulator 104 in response to receiving the operation requests 108. After transmitting the pacs. 002 message, the request processing platform 102 can store the metadata 122 associated with the operation requests 108 in a report database 124 (e.g., IRDB) communicatively coupled with the request processing platform 102.

Additionally or alternatively, the report database 124 may receive a notification message from the request processing platform 102 in response to the request processing platform 102 receiving the operation requests 108. For example, the request processing platform 102 can transmit camt.054 messages to the report database 124 to notify entities (e.g., an account owner) associated with the operation requests 108 that the operation requests have been reported. The camt.054 messages can fulfill a standard for exchanging electronic messages set by the International Organization for Standardization (ISO), such as ISO 20022. Examples of the operation requests 108 can include debit card entries or credit card entries (e.g., incoming transactions or outgoing transactions).

After receiving the operation requests 108 from the load simulator 104, the request processing platform 102 additionally can identify a respective type 126 of the operation requests 108. Based on the respective type 126, the request processing platform 102 can tag the operation requests 108 with a respective priority indicator 128. The operation validation platform 110 then can use the respective priority indicator 128 to determine an order 130 to process the operation requests 108. For example, if the respective type 126 is associated with validating the operation requests 108, the operation validation platform 110 may assign higher priority to a corresponding operation request. The request processing performance of the processing network 100 can be based on how many operation requests are successfully processed. In some examples, fraudulent operation requests or other similarly unsuitable operation requests cannot be successfully processed. Accordingly, by prioritizing validation of the operation requests 108, the processing network 100 can successfully process a relatively higher number of operation requests and increase the request processing performance of the processing network 100.

To validate the operation requests 108 from the load simulator 104, the request processing platform 102 can transmit the operation requests 108 to an operation validation platform 110 using an integration platform 132 (e.g., Mulesoft) in the processing network 100. Examples of the operation validation platform 110 can include an integration platform adapter, a deposit platform, TIBCO, IFMX, or a combination of these. MW Adapter and Deposit can be associated with account validation, whereas TIBCO and IFMX can be associated with fraud validation.

The operation validation platform 110 can validate a subset of the operation requests 134 after receiving the operation requests 108 from the request processing platform 102. Validating the operation requests 108 can involve validating an entity associated with the operation requests 108. For example, if the operation requests 108 are financial transactions associated with a bank, validating the entity can include verifying that a bank account number or account details associated with a bank account are valid before processing. Additionally or alternatively, validating the operation requests 108 can include preventing fraud, such as by confirming ownership associated with the operation requests 108. For example, if the operation requests 108 involve high-risk deposits, a financial institution can use microdeposits to confirm that the entity associated with the high-risk deposits can access the bank account used to hold the high-risk deposits. After being validated by the operation validation platform 110, the subset of the operation requests 134 can be transmitted to the request processing platform 102 using the integration platform 132. From the request processing platform 102, the subset of the operation requests 134 can be transmitted to the internal service platform 106 for processing.

In some examples, the adjustments to the request processing platform 102 can include adjusting an allocation of computing resources 136 in the request processing platform 102. Examples of the computing resources being allocated can include memory, CPU, RAM, virtual machines, servers, or other suitable computing resources. For example, to increase throughput in the request processing platform 102, an increase in memory allocation can be implemented. Additional adjustments to increase the throughput can include increasing a number of processing servers and increasing a number of CPUs allocated to the request processing platform 102.

To further increase the throughput, a configuration 138 for an orchestration engine 140 in the request processing platform 102 can be adjusted based on a predetermined performance threshold associated with the target load 114. Examples of the predetermined performance threshold can include a predetermined throughput threshold 139 or a predetermined latency threshold. The orchestration engine 140 can automate coordination and management with respect to the allocation of the computing resources 136. In some examples, the configuration 138 can be adjusted by increasing a number of threads used in the orchestration engine 140, thereby increasing the throughput for the request processing platform 102. The threads associated with the configuration 138 can correspond to execution context used by the orchestration engine 140 to execute certain processes. For example, a number of worker threads in the orchestration engine 140 can be increased based on the target load 114, causing an increase in a number of operation requests processed by the internal service platform 106.

Establishing a connection 142 directly between the request processing platform 102 and the internal service platform 106 can enable increased scalability and resilience for the request processing platform 102. Using the connection 142, the internal service platform 106 can handle a growing amount of operation requests as defined by the target load 114 from the load simulator 104. For example, an operation request gateway directly connecting the request processing platform 102 with the internal service platform 106 can facilitate communication to enable relatively faster processing of the operation requests 108 such that an increased number of operation requests are accommodated. Additionally or alternatively, using a messaging queue as the connection 142 similarly can enable relatively faster processing by decreasing a degree of dependency associated with the internal service platform 106.

Although FIG. 1 shows a certain number and arrangement of components, this example is intended to be illustrative and non-limiting. Other examples may include more components, fewer components, different components, or a different arrangement of the components shown in FIG. 1. For instance, the operation validation platform 110 may include a separate component for fraud validation associated with the operation requests 108. Any suitable arrangement of the depicted components is contemplated herein.

FIG. 2 is a block diagram of an example of a computing system 200 capable of implementing adjustments 202 to increase request processing performance, according to one example of the present disclosure. The computing system 200 includes a processing device 204 that is communicatively coupled to a memory device 206. In some examples, the processing device 204 and the memory device 206 can be part of the same computing device, such as the computing system 200. As depicted in FIG. 2, the processing device 204 and the memory device 206 are a part of the request processing platform 102. In other examples, the processing device 204 and the memory device 206 can be distributed from (e.g., remote to) one another. For instance, the memory device 206 may be hosted by a cloud storage provider.

The processing device 204 can include one processor or multiple processors. Non-limiting examples of the processing device 204 include a Field-Programmable Gate Array (FPGA), an application-specific integrated circuit (ASIC), or a microprocessor. The processing device 204 can execute instructions 208 stored in the memory device 206 to perform operations. The instructions 208 may include processor-specific instructions generated by a compiler or an interpreter from code written in any suitable computer-programming language, such as C, C++, C#, Java, or Python.

The memory device 206 can include one memory or multiple memories. The memory device 206 can be volatile or non-volatile. Non-volatile memory includes any type of memory that retains stored information when powered off. Examples of the memory device 206 include electrically erasable and programmable read-only memory (EEPROM) or flash memory. At least some of the memory device 206 can include a non-transitory computer-readable medium from which the processing device 204 can read instructions 208. A non-transitory computer-readable medium can include electronic, optical, magnetic, or other storage devices capable of providing the processing device 204 with computer-readable instructions or other program code. Examples of a non-transitory computer-readable medium can include a magnetic disk, a memory chip, ROM, random-access memory (RAM), an ASIC, a configured processor, and optical storage.

The processing device 204 may also be communicatively coupled to an I/O device for displaying, for example, a user interface that may be operated to adjust the computing system 200. The I/O device may also include any suitable device (e.g., a keyboard or a mouse) for configuring the computing system 200. The processing device 204 may also be communicatively coupled to a network device for communicating with and among other devices in the computing system 200 over a network. In some examples, the network device is a network interface card. In other examples, the network device may be a virtual network interface implemented in software. The network may include all or part of multiple networks, including the Internet, a local area network (LAN), a wide area network (WAN), wireless network, cellular network, or the like.

The processing device 204 can execute the instructions 208 to perform operations. The instructions 208 may include program code for processing a plurality of operation requests 108 using the processing device 204. In some examples, a load simulator 104 can generate the operation requests to test an ability of the processing device 204 to handle a target load 114 associated with processing the operation requests 108. For example, in accordance with the example from FIG. 1, the processing device 204 in a request processing platform 102 can receive the operation requests 108 from the load simulator 104.

In some examples, a predetermined latency threshold 210 can be based on the target load 114. For example, latency in processing the operation requests 108 may be relatively higher for a higher number of operation requests being handled by the processing device 204 compared to a lower number of operation requests. To meet the predetermined latency threshold 210, the processing device 204 can adjust deployment architecture 212 of the request processing platform 102. For example, a processing network (e.g., the processing network 100 of FIG. 1) can include a first interface for communication between the request processing platform 102 and an internal service platform 106. A second interface in the processing network can connect the request processing platform 102 with a database in the processing network. To reduce the latency in processing the operation requests 108, the first interface can be merged with the second interface to generate an artifact, thereby avoiding intermediate API calls that can be relatively time-consuming.

The database 118 can be communicatively coupled with the request processing platform 102 to store information associated with the operation requests 108, such as identifying or processing the operation requests 108. Querying the database 118 can be used to fetch the information from the database 118, which is often a time-consuming process, thereby contributing to the latency in processing the operation requests 108. To decrease response time associated with querying the database 118, the request processing platform 102 or another suitable computing device in the processing network can adjust the database 118. Decreasing the response time can increase the response processing performance by reducing latency associated with querying the database 118. In some examples, one or more columns 214 in the database 118 can be indexed by generating a unique key 216 associated with the columns 214 in a database index 218 for the database 118. Querying an indexed column can be relatively faster than querying a non-indexed column by scanning through the database more quickly. For example, each operation request 108 can have a unique identification number that is stored in a specific column of the database 118. The specific column can be indexed such that queries to the database 118 can use the specific column to search the database 118 using the unique identification number.

Additionally or alternatively, adjusting the database 118 can include flattening a data file 220 in the database such that the data file 220 is converted from a first data type 222a to a second data type 222b. For example, the operation requests 108 may be received as XML format based on guidelines from the International Organization for Standardization (ISO). To enable relatively faster parsing, the XML format can be converted to text format, thereby improving the response time associated with querying the database 118. Another adjustment to the database 118 can involve joining a first data set 224a in the database 118 with a second data set 224b in the database 118 to generate a third data set 224c. For example, if the database 118 contains a first table and a second table, the first table can be joined with the second table to generate a third table in the database 118. Instead of having to search through the first table and the second table, querying the database 118 can involve searching through the third table. In some examples, the first data set 224a may have a different data type than the second data set 224b. In such examples, the first data set 224a can be flattened to have a same data type as the second data set 224b before joining the first data set 224a with the second data set 224b.

FIG. 3 is a flowchart of a process 300 for implementing adjustments to increase request processing performance in a processing network, according to one example of the present disclosure. In some examples, the processing device 204 can implement some or all of the blocks shown in FIG. 3. Other examples can include more blocks, fewer blocks, different blocks, or a different order of the blocks than is shown in FIG. 3. The blocks of FIG. 3 are discussed below with reference to the components discussed above in relation to FIGS. 1-2.

At block 302, the processing device 204 receives a plurality of operation requests 108 generated by a load simulator 104. The load simulator 104 can test a target load 114 associated with the operation requests 108. For example, the target load 114 can be associated with a predetermined throughput threshold 139 for processing the operation requests 108. To test whether the processing device 204 can meet the predetermined throughput threshold 139, the load simulator 104 can generate the operation requests 108 for processing by the processing device 204.

At block 304, the processing device 204 adjusts an allocation of computing resources 136 in the request processing platform 102 based on the target load 114. To increase the request processing performance of the processing device 204, the processing device 204 can allocate relatively higher amounts of computing resources to certain processes. For example, to increase throughput with respect to processing the operation requests 108, the processing device 204 can increase memory allocation for each virtual machine in the processing device 204 that handles processing of the operation requests 108.

At block 306, the processing device 204 adjusts a configuration 138 of an orchestration engine 140 in the request processing platform 102 based on the predetermined throughput threshold 139 associated with the target load 114. The configuration 138 can be adjusted by increasing a number of threads for the orchestration engine 140, thereby enabling the orchestration engine 140 to improve the allocation of the computing resources 136. With improved allocation of the computing resources, the processing device

204 can meet the predetermined throughput threshold 139 for processing the operation requests 108.

At block 308, the processing device 204 establishes a connection 142 to an internal service platform 106 that processes the operation requests 108. The connection 142 can directly couple the internal service platform 106 with the processing device 204 such that communication between the internal service platform 106 and the processing device 204 is relatively faster. For example, the processing device 204 can connect to the internal service platform 106 using a messaging queue as the connection 142. Using the messaging queue can enable communication or coordination between decoupled components in the processing network 100, thereby improving the request processing performance. For example, the message queue can enable asynchronous communication such that the operation requests 108 can be added to the messaging queue without waiting for previous operation requests to be processed.

At block 310, the processing device 204 transmits the operation requests 108 to the internal service platform 106 to process a predetermined number of operation requests 116 associated with the target load 114. In some examples, to meet the predetermined throughput threshold, the internal service platform 106 may process the predetermined number of operation requests 116. If the internal service platform 106 cannot process the predetermined number of operation requests 116, the processing device 204 can identify further components in the processing network 100 to adjust to fulfill the target load 114. For example, the processing device 204 may determine that CPU allocation is insufficient for the internal service platform 106, thereby causing relatively low throughput. In response, the processing device 204 can adjust the allocation of computing resources 136 to increase the CPU allocation to the internal service platform 106.

Figure 4:
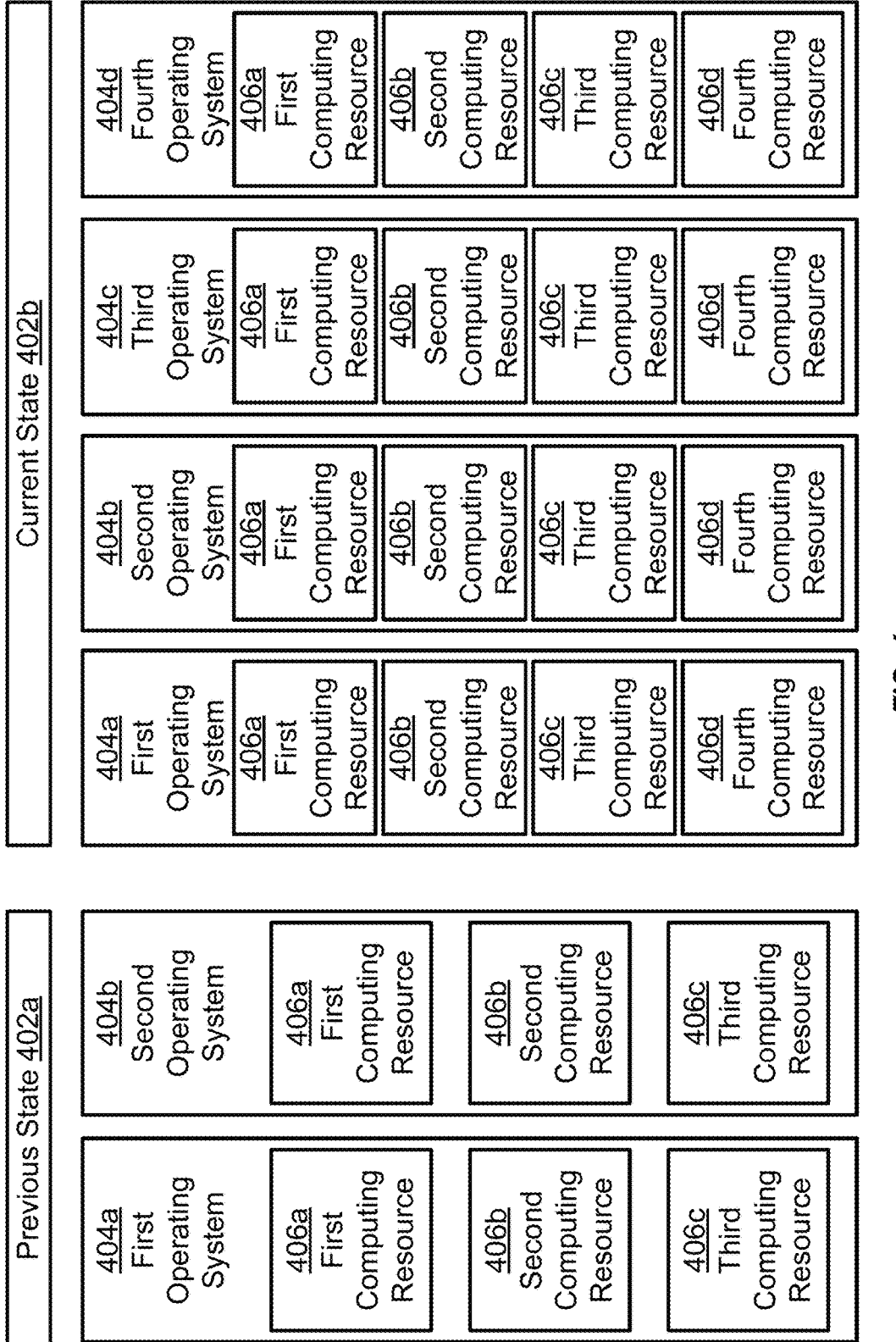
FIG. 4 is a block diagram of an example of an adjustment to increase request processing performance in a processing network, according to one example of the present disclosure.

FIG. 4 is a block diagram of an example 400 of an adjustment 202 to increase request processing performance in a processing network (e.g., the processing network 100 of FIG. 1), according to one example of the present disclosure. As described above for FIG. 1, request processing performance in the processing network can be increased by adjusting an allocation of computing resources 136. A previous state 402a and a current state 402b for a computing system (e.g., the computing system 200 of FIG. 2) are depicted in FIG. 4, demonstrating the adjustment 202 implemented for the computing system. The previous state 402a can represent a first state of the computing system prior to adjusting the allocation of computing resources 136. The current state 402b can represent a second state of the computing system after adjusting the allocation of computing resources 136. The previous state 402a can include fewer computing resources (e.g., RAM, memory, virtual machines, etc.) compared to the current state 402b. For example, the previous state 402a can include a first operating system 404a and a second operating system 404b. In comparison, the current state 402b can include the first operating system 404a, the second operating system 404b, the third operating system 404c, and a fourth operating system 404d.

Each operating system 404a-d in the example 400 can include one or more computing resources 406a-d. The operating systems 404a-b in the previous state 402a may include fewer computing resources than the current state 402b. For example, as depicted in FIG. 4, the operating systems 404a-b in the previous state 402a can include a first computing resource 406a, a second computing resource 406b, and a third computing resource 406c. Conversely, the operating systems 404a-d in the current state 402b can include a fourth computing resource 406d in addition to the computing resources 406a-c in the operating systems 404a-b in the previous state 402a.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A non-transitory computer-readable medium comprising instructions that are executable by a processing device of a request processing platform for causing the processing device to perform operations comprising:
   receiving a plurality of operation requests generated by a load simulator, the load simulator being configured to test a target load associated with the plurality of operation requests;
   adjusting an allocation of computing resources in the request processing platform based on the target load;
   adjusting a configuration of an orchestration engine in the request processing platform based on a predetermined throughput threshold associated with the target load, wherein adjusting the configuration of the orchestration engine in the request processing platform comprises increasing a number of threads used in the orchestration engine;
   establishing a connection to an internal service platform, the internal service platform being configured to process the plurality of operation requests; and
   in response to establishing the connection to the internal service platform, transmitting the plurality of operation requests to the internal service platform to process a predetermined number of operation requests associated with the target load.

2. The non-transitory computer-readable medium of claim 1, wherein determining the allocation of computing resources in the request processing platform is based at least in part on throughput requirements associated with the request processing platform, and wherein the throughput requirements are determined based on the target load.

3. The non-transitory computer-readable medium of claim 1, wherein the operations further comprise, in response to receiving the plurality of operation requests:
   transmitting a respective acknowledgement corresponding to the plurality of operation requests to the load simulator; and
   subsequent to transmitting the respective acknowledgement, storing metadata associated with the plurality of operation requests in a database communicatively coupled with the request processing platform.

4. The non-transitory computer-readable medium of claim 1, wherein the operations further comprise:
   determining an adjustment to querying a database communicatively coupled with the request processing platform, wherein the adjustment is determined based on a predetermined latency threshold associated with the request processing platform, and wherein applying the adjustment comprises:
      indexing a column in the database by generating a unique key associated with the column in a database index of the database;
      flattening a data file in the database, wherein the data file is converted from a first data type to a second data type; and joining a first data set in the database with a second data set in the database to generate a third data set.

5. The non-transitory computer-readable medium of claim 1, wherein the operations further comprise:

adjusting deployment architecture of the request processing platform based on a predetermined latency threshold associated with the request processing platform by generating an artifact by merging at least two interfaces associated with the request processing platform, wherein each interface of the at least two interfaces communicatively couples the request processing platform with a respective component of a processing network.

6. The non-transitory computer-readable medium of claim 1, wherein the operations further comprise, prior to transmitting the plurality of operation requests to the internal service platform:

transmitting the plurality of operation requests to an operation validation platform using an integration platform, wherein the operation validation platform validates the plurality of operation requests;

receiving, from the operation validation platform, a subset of operation requests of the plurality of operation requests, wherein the subset of operation requests is validated by the operation validation platform; and transmitting the subset of operation requests to the internal service platform to process the predetermined number of operation requests associated with the target load.

7. The non-transitory computer-readable medium of claim 6, wherein the operations further comprise, prior to transmitting the plurality of operation requests to the operation validation platform:

identifying a respective type of the plurality of operation requests; and tagging the plurality of operation requests with a respective priority indicator based on the respective type of the plurality of operation requests, wherein the operation validation platform determines an order to process the plurality of operation requests using the respective priority indicator.

8. A computer-implemented method comprising:

receiving, by a request processing platform, a plurality of operation requests generated by a load simulator, the load simulator being configured to test a target load associated with the plurality of operation requests;

adjusting, by the request processing platform, an allocation of computing resources in the request processing platform based on the target load;

adjusting, by the request processing platform, a configuration of an orchestration engine in the request processing platform based on a predetermined throughput threshold associated with the target load, wherein adjusting the configuration of the orchestration engine in the request processing platform comprises increasing a number of threads used in the orchestration engine;

establishing, by the request processing platform, a connection to an internal service platform, the internal service platform being configured to process the plurality of operation requests; and in response to establishing the connection to the internal service platform, transmitting, by the request processing platform, the plurality of operation requests to the internal service platform to process a predetermined number of operation requests associated with the target load.

9. The computer-implemented method of claim 8, wherein determining the allocation of computing resources in the request processing platform is based at least in part on throughput requirements associated with the request processing platform, and wherein the throughput requirements are determined based on the target load.

10. The computer-implemented method of claim 8, further comprising, in response to receiving the plurality of operation requests:

transmitting a respective acknowledgement corresponding to the plurality of operation requests to the load simulator; and subsequent to transmitting the respective acknowledgement, storing metadata associated with the plurality of operation requests in a database communicatively coupled with the request processing platform.

11. The computer-implemented method of claim 8, further comprising:

determining an adjustment to querying a database communicatively coupled with the request processing platform, wherein the adjustment is determined based on a predetermined latency threshold associated with the request processing platform, and wherein applying the adjustment comprises:

indexing a column in the database by generating a unique key associated with the column in a database index of the database;

flattening a data file in the database, wherein the data file is converted from a first data type to a second data type; and joining a first data set in the database with a second data set in the database to generate a third data set.

12. The computer-implemented method of claim 8, further comprising:

adjusting deployment architecture of the request processing platform based on a predetermined latency threshold associated with the request processing platform by generating an artifact by merging at least two interfaces associated with the request processing platform, wherein each interface of the at least two interfaces communicatively couples the request processing platform with a respective component of a processing network.

13. The computer-implemented method of claim 8, further comprising, prior to transmitting the plurality of operation requests to the internal service platform:

transmitting the plurality of operation requests to an operation validation platform using an integration platform, wherein the operation validation platform validates the plurality of operation requests;

receiving, from the operation validation platform, a subset of operation requests of the plurality of operation requests, wherein the subset of operation requests is validated by the operation validation platform; and transmitting the subset of operation requests to the internal service platform to process the predetermined number of operation requests associated with the target load.

14. The computer-implemented method of claim 13, further comprising, prior to transmitting the plurality of operation requests to the operation validation platform:

identifying a respective type of the plurality of operation requests; and tagging the plurality of operation requests with a priority indicator based on the respective type of the plurality of operation requests, wherein the operation validation platform determines an order to process the plurality of operation requests using the respective priority indicator.

15. A system comprising:

a processing device of a request processing platform; and a memory device that includes instructions executable by the processing device for causing the processing device to perform operations comprising:

receiving a plurality of operation requests generated by a load simulator, the load simulator being configured to test a target load associated with the plurality of operation requests;

adjusting an allocation of computing resources in the request processing platform based on the target load;

adjusting a configuration of an orchestration engine in the request processing platform based on a predetermined throughput threshold associated with the target load, wherein adjusting the configuration of the orchestration engine in the request processing platform comprises increasing a number of threads used in the orchestration engine;

establishing a connection to an internal service platform, the internal service platform being configured to process the plurality of operation requests; and in response to establishing the connection to the internal service platform, transmitting the plurality of operation requests to the internal service platform to process a predetermined number of operation requests associated with the target load.

16. The system of claim 15, wherein determining the allocation of computing resources in the request processing platform is based at least in part on throughput requirements associated with the request processing platform, and wherein the throughput requirements are determined based on the target load.

17. The system of claim 15, wherein the operations further comprise, in response to receiving the plurality of operation requests:

transmitting a respective acknowledgement corresponding to the plurality of operation requests to the load simulator; and subsequent to transmitting the respective acknowledgement, storing metadata associated with the plurality of operation requests in a database communicatively coupled with the request processing platform.

18. The system of claim 15, wherein the operations further comprise:

determining an adjustment to querying a database communicatively coupled with the request processing platform, wherein the adjustment is determined based on a predetermined latency threshold associated with the request processing platform, and wherein applying the adjustment comprises:

indexing a column in the database by generating a unique key associated with the column in a database index of the database;

flattening a data file in the database, wherein the data file is converted from a first data type to a second data type; and joining a first data set in the database with a second data set in the database to generate a third data set.

19. The system of claim 15, wherein the operations further comprise:

adjusting deployment architecture of the request processing platform based on a predetermined latency threshold associated with the request processing platform by generating an artifact by merging at least two interfaces associated with the request processing platform, wherein each interface of the at least two interfaces communicatively couples the request processing platform with a respective component of a processing network.

20. The system of claim 15, wherein the operations further comprise, prior to transmitting the plurality of operation requests to the internal service platform:

transmitting the plurality of operation requests to an operation validation platform using an integration platform, wherein the operation validation platform validates the plurality of operation requests;

receiving, from the operation validation platform, a subset of operation requests of the plurality of operation requests, wherein the subset of operation requests is validated by the operation validation platform; and transmitting the subset of operation requests to the internal service platform to process the predetermined number of operation requests associated with the target load.

* * * * *